E. I. DODDS.
STAY BOLT STRUCTURE.
APPLICATION FILED APR. 26, 1918.
1,295,862.
Patented Mar. 4, 1919.
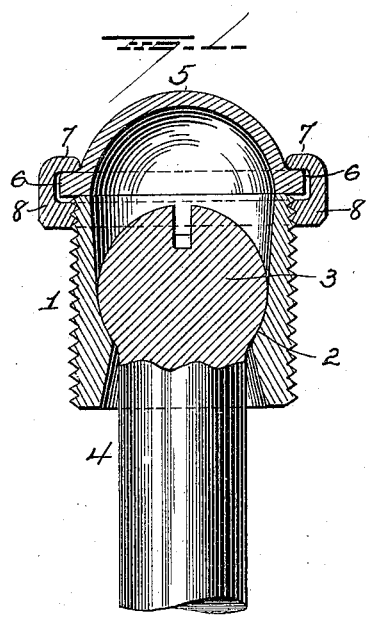
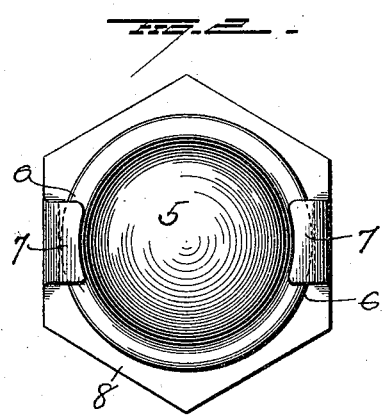
WITNESSES
INVENTOR
E. I. Dodds
By Seymour & Bright
Attorneys

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,295,862.  Specification of Letters Patent.  Patented Mar. 4, 1919.

Application filed April 26, 1918. Serial No. 230,898.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures for boilers,—the object of the invention being to provide simple and efficient means whereby the cap or closure of said structure may be quickly removed to expose the head of the bolt for inspection and testing and so that the said cap or closure may be quickly replaced and firmly secured in its normal position.

With this and other objects in view, the invention consists in certain novel features of construction and combinations of parts as hereinafter set forth and pointed out in the claim.

In the accompanying drawings; Figure 1 is a section view showing an embodiment of my invention, and Fig. 2 is a plan view of the same.

1 represents a bearing sleeve which is threaded exteriorly to screw through a suitable hole in the boiler sheet and provided interiorly with a curved seat 2 which serves as a bearing for the curved or spherical head 3 of a staybolt 4.

The outer end of the bearing sleeve is closed by a removable cap 5 which, in the present instance, is made partly spherical or dome-shaped and said cap is made with a peripheral flange 6 which affords a seat for the cap upon the end of outer end of the bearing sleeve.

The peripheral flange 6 of the cap 5 also serves to receive the jaws 7 of a clamping member 8. This clamping member is made in the form of an interiorly threaded ring or nut to screw on the externally threaded bearing sleeve 1, and said ring or nut has a hexagonal or similar external configuration to permit the application of a wrench for turning the same.

It will be apparent that when the hemispherical cap has been placed in position on the end of the bearing sleeve 1 so that its peripheral flange shall be disposed behind the jaws 7 of the clamping member 8, and the latter is then screwed inwardly on the sleeve, said cap will be tightly clamped upon the end of said sleeve and the latter effectually closed.

By screwing the clamping ring or member 8 outwardly a short distance on the bearing sleeve, the cap will be at once unlocked and may be quickly removed to expose the head of the bolt for inspecting and testing the latter. The said cap may be as quickly replaced and secured in place to close the outer end of the bearing sleeve.

Having fully described my invention what I claim as new and desire to secure by Letters-Patent, is:—

In a staybolt structure, the combination with an externally threaded bearing sleeve, and a partly spherical cap having a flange to rest on said bearing sleeve, of a clamping ring threaded on said sleeve and having jaws spaced apart, each of said jaws having a lip to engage the flange of the cap, whereby the cap may be removed laterally from the bearing sleeve and pass from between said jaws when the clamping ring is loosened.

In testimony whereof, I have signed this specification in the presence of two subscribing witnesses.

ETHAN I. DODDS.

Witnesses:
S. G. NOTTINGHAM,
R. S. FERGUSON.

Copies of this patent may be obtained for five cents each, by addressing the "Commissioner of Patents, Washington, D. C."